United States Patent Office 3,383,333
Patented May 14, 1968

3,383,333
ORGANOMETALLIC CATALYST COMPOSITION AND USE THEREOF IN ALKENE OXIDE POLYMERIZATION
Henry L. Hsieh, Bartlesville, Okla., assignor to Phillips Petroleum Company, a corporation of Delaware
No Drawing. Filed June 7, 1965, Ser. No. 462,051
10 Claims. (Cl. 260—2)

ABSTRACT OF THE DISCLOSURE

Rubbery polymers of alkane oxides are made by polymerizing at least one alkene oxide monomer with a catalyst system comprising an organometallic compound and zinc sulfide.

This invention relates to alkene oxide polymerization. In one aspect, this invention relates to catalyst systems for polymerizing epoxides. In another aspect, this invention relates to processes of polymerizing alkene oxides.

A variety of different catalyst systems for polymerizing alkene oxides are described in the patent art and in the technical literature. Although some of the prior art catalysts have been accepted commercially, most of them have not advanced beyond the laboratory because of the quality of the alkene oxide polymers produced. In some cases, the polymer product is a low molecular weight liquid with very limited utility. In other cases, the alkene oxide polymer is a high molecular weight waxy solid.

According to this invention, these and other disadvantages of the prior art catalyst systems for polymerizing alkene oxides are overcome by providing a novel catalyst system which results in the formation of a high molecular weight, rubbery alkene oxide polymer. The novel catalyst system of this invention comprises an organometallic compound and zinc sulfide. In one embodiment of the invention, the catalyst system comprises an organometallic compound, zinc sulfide, and water. The organometallic compound employed in the practice of this invention is an organozinc or an organoaluminum compound such as diorganozinc compounds, triorganoaluminum compounds, organozinc monohalides, organozinc monohydrides, organoaluminum monohalides, organoaluminum monohydrides, organoaluminum dihalides, organoaluminum dihydrides, and organoaluminum sequihalides. The novel catalyst of this invention can be used to homopolymerize one alkene oxide or copolymerize two or more alkene oxides. When at least one of the alkene oxides is unsaturated, the polymer product can be sulfur vulcanized. In all cases, the alkene oxide polymers produced by the catalyst of this invention range from a soft rubber to a quite hard polymer having elastomeric properties.

Accordingly, it is an object of this invention to provide an improved process of polymerizing alkene oxides.

Another object of this invention is to provide a novel catalyst system for polymerizing alkene oxides.

A further object of this invention is to provide a process of polymerizing alkene oxides which results in the formation of a high molecular weight rubbery polymer.

Still another object of this invention is to provide a process of polymerizing alkene oxides wherein the monomer conversion is much higher than the monomer conversion by the processes of the prior art.

A still further object of this invention is to produce alkene oxide polymers which are flexible at low temperatures, and which are highly resistant to the effects of high temperatures and to the effects of ozone.

These and other objects of the invention will become apparent to one skilled in the art after studying the following detailed description and the appended claims.

The novel catalyst of this invention can be used for polymerizing any saturated or unsaturated alkene oxide to form a rubbery polymer having good flexibility. For example, the catalyst of this invention can be used for polymerizing alkene oxides containing up to and including 20 carbon atoms per molecule. the novel catalyst is particularly useful for polymerizing alkene oxide monomers containing from about 2 to 8 carbon atoms. Thus, alkaline oxides which can be polymerized in accordance with this invention can be represented by the formula

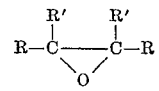

wherein R and R' are selected from the group consisting of hydrogen, saturated aliphatic, saturated cycloaliphatic, monoolefinic aliphatic, diolefinic aliphatic (conjugated and non-conjugated), monoolefinic cycloaliphatic, diolefinic cycloaliphatic (conjugated and non-conjugated), and aromatic radicals and combinations of these such as aralkyl, alkaryl, and the like. Some or all of the R and R' radicals can be halogen-substituted, and can contain oxygen in the form of an acrylic ether linkage (—O—) or an oxirane group

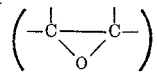

Further, the alkene oxides represented by the above formula can contain 1 or 2 olefinic linkages, 1 or 2 oxirane groups, and up to 1 ether linkage. In addition, both R' variables can represent a divalent aliphatic hydrocarbon radical which, together with the carbon atoms of the oxirane group, can form a cycloaliphatic hydrocarbon nucleus containing from about 4 to about 10 carbon atoms and preferably from about 4 to about 8 carbon atoms.

Specific examples of some of the alkene oxides which are within the above structural formula and which can be homopolymerized or copolymerized in accordance with this invention are ethylene oxide (epoxyethane);

1,2-epoxypropane (propylene oxide);
1,2-epoxybutane;
2,3-epoxybutane;
1,2-epoxypentane;
2,3-epoxypentane;
1,2-epoxyhexane;
3,4-epoxyhexane;
1,2-epoxyheptane;
2,3-epoxyoctane;
2,3-dimethyl-2,3-epoxypentane;
1,2-epoxy-4-methylpentane;
2,3-epoxy-5-methylhexane;
1,2-epoxy-4,4-dimethylpentane;
4,5-epoxyeicosane;
1-chloro-2,3-epoxypropane (epichlorohydrin);
1-bromo-2,3-epoxypropane;
1,5-dichloro-2,3-epoxypentane;
2-iodo-3,4-epoxybutane;
styrene oxide;
6-oxabicyclo[3.1.0]hexane;
7-oxabicyclo[4.1.0]heptane;
3-propyl-7-oxabicyclo[4.1.0]heptane;
bis(2,3-epoxybutyl) ether;
tert-butyl 4,5-epoxyhexyl ether; and
2-phenylethyl 3,4-epoxybutyl ether.

Unsaturated alkene oxides within the above structural formula, including ethers, which can be homopolymerized or copolymerized with the saturated alkene oxides include allyl 2,3-epoxypropyl ether (allyl glycidyl ether); allyl 3,4-epoxybutyl ether; 1-methallyl 3,4-epoxyhexyl ether; 3-hexenyl 5,6-epoxyhexyl ether; 2,6-octadienyl 2,3,7,8-diepoxyoctyl ether; 6-phenyl-3-hexenyl 3-ethyl-5,6-epoxyhexyl ether; 3,4-epoxy-1-butene (butadiene monoxide); 3,4-epoxy-1-pentene; 5-phenyl-3,4-epoxy-1-pentene; 1,2,9,10-diepoxy-5-decene; 6,7-di-n-butyl-3,4,9,10-diepoxy-1,11-dodecadiene; epoxy vinyl ether; allyl 2-methyl-2,3-epoxypropyl ether; 3-cyclohexyl-2-propenyl 4-cyclohexyl-3,4-epoxybutyl ether; 2,4-pentadienyl 2,3-diethyl-3,4-epoxybutyl ether; 1-methallyl 6-phenyl-3,4-epoxyhexyl ether; 5-(4-tolyl)2,3-epoxypentyl vinyl ether; bis[4-(3-cyclopentenyl)2,3-epoxybutyl] ether; 2-(2,4-cyclohexadienyl) ethyl 2,3-epoxybutyl ether; 2-(2,5-cyclohexadienyl)ethyl 2-benzyl-4,5-epoxypentyl ether; 3,4-epoxy-1,5-hexadienyl isopropyl ether; allyl 3,4-dimethyl-3,4-epoxyhexyl ether; 3,4-epoxy-4-(2,3-dimethylphenyl)1-butene; 3,4-dimethyl-3,4-epoxy-1-pentene; 5-(4-methylcyclohexyl)3,4 - epoxy-1-pentene; 4,5-diethyl-4,5-epoxy-2,6 - octadiene; 4-(2,4-cyclopentadienyl)1,2,7-diepoxyheptane; and 1-phenyl-1,2-epoxy-5,7-octadiene.

The novel catalyst system of this invention comprises a mixture of an organometallic compound and zinc sulfide. In another embodiment of the invention, water is used as a third component in the catalyst system. The organometallic compound of the catalyst can be represented by the formula

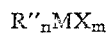

wherein R" is a hydrocarbon radical selected from the group consisting of saturated aliphatic, saturated cycloaliphatic, and aromatic containing from 1 to 20 carbon atoms, inclusive; M is a metal selected from the group consisting of aluminum and zinc; X is a member of the class consisting of hydrogen, fluorine, chlorine, bromine, and iodine; $n$ is an integer of from 1 to 3 inclusive; $m$ is an integer of from 0 to 2, inclusive; and the sum of the integers $n$ and $m$ equals the valence of the metal M. Organozinc and organoaluminum compounds within the above formula include diorganozinc compounds, triorganoaluminum compounds, organozinc monohalides, organozinc monohydrides, organoaluminum monohalides, organoaluminum dihalides, organoaluminum monohydrides, organoaluminum dihydrides, and organoaluminum sesquihalides. The organoaluminum sesquihalides as herein defined are intended to mean a mixture of organoaluminum monohalides and organoaluminum dihalides of the formulas $R''_2AlX$ and $R''AlX_2$, respectively, wherein R" is the same as hereinbefore defined with respect to the general formula and X is a halogen. The organoaluminum sesquihalides can then be written as $R''_3Al_2X_3$ or as $R''_{1\ 1/2}AlX_{1\ 1/2}$. Exemplary organometallic compounds within the above general formula include trimethylaluminum; triethylaluminum; tri-n-propylaluminum; triisobutylaluminum; tri-n-hexylaluminum; tri-n-octylaluminum; tricyclohexylaluminum; triphenylaluminum; tri-n-butylaluminum; tri-n-decylaluminum; tri-n-eicosylaluminum; methyldiphenylaluminum; tribenzylaluminum; bis(3,5-n-heptylphenyl)methylaluminum; tri-1-naphthylaluminum; di-n-octylphenylaluminum; tri-4-tolylaluminum; dimethylchloroaluminum; methyldichloroaluminum; methylisobutylchloroaluminum; n-heptyldifluoroaluminum; diphenylbromoaluminum; dibenzylchloroaluminum; di-n-octylchloroaluminum; n-octylphenylchloroaluminum; di-n-eicosyliodoaluminum; n-butyldihydroaluminum; methyldihydroaluminum; diisopropylhydroaluminum; ethylmethylhydroaluminum; diphenylhydroaluminum; benzyl-n-dodecylhydroaluminum; bis(2,4,6 - tri-n-butyloctyl)hydroaluminum; dimethylzinc; diethylzinc; di-n-propylzinc; diisopropylzinc; di-n-butylzinc; diisobutylzinc; di-n-amylzinc; di-n-hexylzinc; di-n-octylzinc; di-n-dodecylzinc; dicyclopentylzinc; dicyclohexylzinc; bis(2,5-dimethylcyclopentyl)zinc; bis(3,5-dimethylcyclohexyl)zinc; diphenylzinc; bis(2-n-hexyltetradecyl)zinc; bis(4-cyclohexyloctyl)zinc; bis(2-n-butylcyclohexyl)zinc; bis(2,4,8 - trimethylhendecyl)zinc; bis(7-n-pentyltetradecyl)zinc; bis[2-(2,3,5-tri-n-butylphenyl)ethyl]zinc; dibenzylzinc; bis(4,6 - dicyclopentyldecyl)zinc; methylethylzinc; ethylisopropylzinc; n-propyl-n-hexylzinc; methylchlorozinc; ethylbromozinc; n-propylchlorozinc; n-amylbromozinc; n-hexyliodozinc; n-octylchlorozinc; cyclopentylchlorozinc; cyclohexylbromozinc; 2-n-hexyltetradecylchlorozinc; 7-n-pentyltetradecylbromozinc; benzylbromozinc; 4,6-dicyclopentyldecylbromozinc; n-dodecylfluorozinc; 3,5-methylcyclohexylchlorozinc; cyclohexyliodozinc; cyclohexylhydrozinc; and n-amylhydrozinc.

The amount of catalyst used for effecting polymerization of the alkene oxides can be varied over a rather broad range. The catalyst level which is desired is preferably and for convenience based on the organometallic compound in the catalyst. Generally, the amount of catalyst is maintained within the range of about 1 to about 100 gram millimoles of organometal per 100 grams of monomer being polymerized and preferably in the range of about 5 to about 40 gram millimoles of organometal per 100 grams of monomer. In the copolymerization of two or more alkene oxide monomers, the amount of catalyst is based on the total amount of all monomers.

The zinc sulfide which is employed with the organometallic compound in accordance with this invention can be used in variable amounts. Generally, the mole ratio of the organometallic compound to the zinc sulfide in the catalyst system is within the range of about 0.25:1 to about 100:1 and preferably in the range of about 1:1 to about 30:1.

When water is used as the third component in the catalyst system in accordance with a modification of the invention, it can be used in any controlled amount which serves to promote the polymerization reaction. Preferably, the water is used in an amount up to about 20 gram millimoles per 100 grams of alkene oxide.

The alkene oxide polymerization reaction of this invention can be carried out either as a batch process or as a continuous process with the novel catalyst system being added in a single initial charge or in predetermined increments during polymerization. Similarly, the monomers may be introduced into the reaction zone in one charge or they may be added gradually during polymerization. In order to expedite and improve the efficiency of the polymerization reaction, it is generally preferred that the reaction be carried out in the presence of an inert dilute. Suitable diluents which can be used for this purpose include paraffinic, cycloparaffinic, and aromatic hydrocarbons containing from about 4 to about 10 carbon atoms per molecule. Exemplary diluents which can be used are butane, pentane, hexane, decane, cyclopentane, cyclohexane, methylcyclohexane, benzene, toluene, xylene, ethylbenzene, and the like. It is also within the spirit and scope of this invention to employ halogenated hydrocarbons such as chlorobenzene and the like as diluents. Since the actual diluent employed is largely a matter of choice, it is obviously possible to employ other diluents than those herein identified without departing from the spirit and scope of the invention. Mixtures of suitable compounds can also be employed as diluents.

The temperature and pressure at which the polymerization process of this invention is effected can vary over a rather wide range. Generally, the polymerization is conducted at a temperature within the range of about 40 to about 250° F. and preferably within the range of about 85 to about 200° F. Polymerization is usually conducted at a pressure which will maintain the materials in the liquid state. It is obvious that the reaction can be conducted at superatmospheric pressures of several thousand pounds if desired.

The duration of the polymerization reaction will depend primarily upon temperature, pressure, and catalyst activity. The process can be conducted for a period of from less than a minute to about 100 hours or more. A preferred range is from about 10 minutes to about 50 hours.

The alkene oxide polymers produced in accordance with the novel catalyst system of this invention exhibit extremely good low temperature flexibility. The polymers are particularly resistant to the effects of heat and to the effects of ozone. The polymers of alkene oxides have unlimited utility in the autmobile industry for fabricating articles such as motor mounts, body mounts, suspension system parts, hoses, and tubing.

The following examples will serve to illustrate the improved results obtained by polymerizing alkene oxides with the novel catalyst system of this invention. It is to be understood that such examples are for the purpose of illustration only and that many variations and modifications can be made from the various examples by one skilled in the art without departing from the concept of this invention.

Examples 1 and 2

Propylene oxide was polymerized by means of a catalyst comprising triisobutylaluminum and zinc sulfide. Another run was conducted whereby propylene oxide was polymerized in the presence of a catalyst comprising triisobutylaluminum, zinc sulfide, and water in order to illustrate the promoting effect obtained by the water. The materials were charged to a reactor in the following proportions:

| | |
|---|---|
| Propylene oxide, parts by weight | 100 |
| Toluene, parts by weight | 860 |
| Triisobutylaluminum, mhm.¹ | 30 |
| Zinc sulfide, parts by weight | Variable |
| Water, mhm.¹ | Variable |
| Temperature, °F. | 158 |
| Time, hours | 48 |

¹ Gram millimoles per 100 grams monomer.

The actual polymerization technique employed involved steps of charging the reactor with toluene and thereafter purging it with nitrogen. The zinc sulfide was then charged to the reactor followed by the propylene oxide and the triisobutylaluminum. In the example using water, it was charged to the reactor after the triisobutylaluminum. At the termination of each run, approximately 1 part by weight of 2,2'-methylene-bis(4-methyl-6-tert-butylphenol) antioxidant was added per 100 weight parts of propylene oxide monomer charged. The reaction mixture from each example was then poured into water which had been previously acidified with hydrochloric acid. The reaction mixture including the acidified water then separated into an aqueous phase and an organic phase. The organic phase was removed and the polymer recovered from it by evaporating the diluent. The polymer product thus recovered was then dried under vacuum. Table I below illustrates the results of each of the examples and the properties of each of the polymers produced.

TABLE I

| Example No. | ZnS Parts | ZnS mhm. | Water, mhm. | Monomer Conversion (Percent) | Inherent Viscosity |
|---|---|---|---|---|---|
| 1 | 3 | 3.1 | | 60 | 2.37 |
| 2 | 3 | 3.1 | 10 | 70 | 2.10 |

In order to determine the inherent viscosity, one-tenth gram of polymer was placed in a wire cage made from 80-mesh screen and the cage was placed in 100 ml. of toluene contained in a wide-mouth, 4-ounce bottle. After standing at room temperature (approximately 77° F.) for about 24 hours, the cage was removed and the solution filtered through a sulfur absorption tube of Grade C porosity to remove any solid particles present. The resulting solution was run through a Medalia type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.

It can be seen from the data in Table I that a high monomer conversion is obtained with the triisobutylaluminum-zinc sulfide catalyst of this invention. As evidenced by the data in Example No. 2, the water serves as a promoter as shown by the higher monomer conversion obtained. The alkene oxide polymers produced in both examples were solid polymers having good elastomeric properties.

Examples 3 and 4

Propylene oxide was polymerized according to this invention in the presence of a catalyst comprising diethylaluminum chloride and zinc sulfide. The amount of zinc sulfide used was varied in order to illustrate the utility of the invention for different amounts and ratios of catalyst. The procedure and the technique employed were the same as that described in connection with Examples 1 and 2 except that for each 100 parts of monomer 430 parts of toluene were employed instead of 860. Table II below illustrates the results of the two examples and the properties of each of the polymers produced.

TABLE II

| Example No. | DEAC, mhm. | ZnS, mhm. | Monomer Conversion (Percent) | Inherent Viscosity | Product |
|---|---|---|---|---|---|
| 3 | 30 | 5 | 71 | 1.87 | Soft rubber. |
| 4 | 30 | 30 | 69 | 1.62 | Do. |

The inherent viscosity of the products obtained from Examples 3 and 4 was determined in the same manner as that described in connection with Examples 1 and 2. Both of the polymers produced were soft rubbers thus indicating the utility of the invention with this catalyst system.

As hereinbefore indicated, any unsaturated alkene oxide can be homopolymerized or copolymerized to form a rubbery product which can be sulfur vulcanized. In the copolymerization of 1,2-epoxypropane and an unsaturated alkene oxide, it is preferred to employ allyl 2,3-epoxypropyl ether (allyl glycidyl ether) as the unsaturated monomer. In the copolymerization of two unsaturated alkene oxides, it is generally preferred to form a copolymer of allyl 2,3-epoxypropyl ether (allyl glycidyl ether) and 3,4-epoxy-1-butene (butadiene monoxide). These copolymers can be sulfur vulcanized with ease because the polymer chains contain a multiplicity of olefinic bonds. Polymerization conditions and techniques for copolymerizing two or more alkene oxides are the same as in the homopolymerization of alkene oxides. Thus, factors such as catalyst level, temperature, pressure, and the like in the homopolymerization reaction can be employed in a like manner in the copolymerization reaction.

Although the invention has been described in considerable detail, it must be understood that such detail is for the purpose of illustration only and that many variations and modifications can be made by one skilled in the art without departing from the spirit and scope of the invention.

I claim:

1. A process of polymerizing at least one alkene oxide of the formula

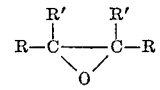

wherein R and R' are selected from the group consisting of hydrogen, saturated aliphatic, saturated cycloaliphatic, monoolefinic aliphatic, diolefinic aliphatic, monoolefinic cycloaliphatic, diolefinic cycloaliphatic, and aromatic radicals, halogen-substituted radicals of the foregoing type, and combinations thereof, and said radicals can contain oxygen in the form of an acyclic ether linkage (—O—) or an oxirane group

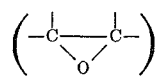

and said alkene oxide can contain 1 or 2 olefinic linkages, 1 or 2 oxirane groups, and 1 ether linkage, and both R' variables in said alkene oxide can represent a divalent aliphatic hydrocarbon radical which together with the oxirane group in said alkene oxide can form a cycloaliphatic nucleus, said process comprising contacting said alkene oxide with a catalyst comprising:

(a) an organometallic compound of the formula

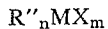

wherein R″ is a hydrocarbon radical selected from the group consisting of saturated aliphatic, saturated cycloaliphatic, and aromatic containing from 1 to 20 carbon atoms, inclusive; M is a metal selected from the group consisting of aluminum and zinc; X is a member of the class consisting of hydrogen, fluorine, chlorine, bromine, and iodine; $n$ is an integer of from 1 to 3, inclusive; $m$ is an integer of from 0 to 2, inclusive; and the sum of the integers $n$ and $m$ equals the valence of the metal M; and (b) zinc sulfide.

2. A process according to claim 1 wherein said polymerization is conducted at a temperature within the range of about 40 to about 250° F.; wherein said organometallic compound is present in an amount within the range of about 1 to 100 gram millimoles per 100 grams of alkene oxide; and wherein the mole ratio of said organometallic compound to said zinc sulfide is within the range of about 0.25:1 to about 100:1.

3. A process of polymerizing at least one alkene oxide of the formula

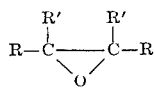

wherein R and R′ are selected from the group consisting of hydrogen, saturated aliphatic, saturated cycloaliphatic, monoolefinic aliphatic, diolefinic aliphatic, monoolefinic cycloaliphatic, diolefinic cycloaliphatic, and aromatic radicals, halogen-substituted radicals of the foregoing type, and combinations thereof, and said radicals can contain oxygen in the form of an acyclic ether linkage (—O—) or an oxirane group

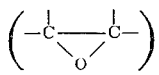

and said alkene oxide can contain 1 or 2 olefinic linkages, 1 or 2 oxirane groups, and 1 ether linkage, and both R′ variables in said alkene oxide can represent a divalent aliphatic hydrocarbon radical which together with the oxirane group in said alkene oxide can form a cycloaliphatic nucleus, said process comprising contacting said alkene oxide with a catalyst comprising:

(a) an organometallic compound of the formula

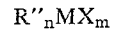

wherein R″ is a hydrocarbon radical selected from the group consisting of saturated aliphatic, saturated cycloaliphatic, and aromatic containing from 1 to 20 carbon atoms, inclusive; M is a metal selected from the group consisting of aluminum and zinc; X is a member of the class consisting of hydrogen, fluorine, chlorine, bromine, and iodine; $n$ is an integer of from 1 to 3, inclusive; $m$ is an integer of from 0 to 2, inclusive; and the sum of the integers $n$ and $m$ equals the valence of the metal M;

(b) zinc sulfide; and (c) water.

4. A process according to claim 3 wherein said polymerization is conducted at a temperature within the range of about 40 to about 250° F.; wherein said organometallic compound is present in an amount within the range of about 1 to about 100 gram millimoles per 100 grams of alkene oxide; wherein the mole ratio of said organometallic compound to said zinc sulfide is within the range of about 0.25:1 to about 100:1; and wherein said water is present in an amount up to about 20 gram millimoles per 100 grams alkene oxide.

5. A process according to claim 3 wherein said alkene oxide is 1,2-epoxypropane; and wherein said organometallic compound is triisobutylaluminum.

6. A process according to claim 3 wherein said alkene oxide is 1,2-epoxypropane; and wherein said organometallic compound is diethylaluminum chloride.

7. A catalyst system comprising:

(a) an organometallic compound of the formula

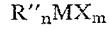

where R″ is a hydrocarbon radical selected from the group consisting of saturated aliphatic, saturated cycloaliphatic, and aromatic containing from 1 to 20 carbon atoms, inclusive; M is a metal selected from the group consisting of aluminum and zinc; X is a member of the class consisting of hydrogen, fluorine, chlorine, bromine, and iodine; $n$ is an integer of from 1 to 3, inclusive; $m$ is an integer of from 0 to 2, inclusive; and the sum of the integers $n$ and $m$ equals the valence of the metal M; and (b) zinc sulfide.

8. A catalyst according to claim 7 wherein the mole ratio of the organometallic compound to the zinc sulfide is within the range of about 0.25:1 to about 100:1.

9. A catalyst system comprising:

(a) an organometallic compound of the formula

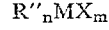

wherein R″ is a hydrocarbon radical selected from the group consisting of saturated aliphatic, saturated cycloaliphatic, and aromatic containing from 1 to 20 carbon atoms, inclusive; M is a metal selected from the group consisting of aluminum and zinc; X is a member of the class consisting of hydrogen, fluorine, chlorine, bromine, and iodine; $n$ is an integer of from 1 to 3, inclusive; $m$ is an integer of from 0 to 2, inclusive; and the sum of the integers $n$ and $m$ equals the valence of the metal M;

(b) zinc sulfide; and (c) water.

10. A catalyst according to claim 9 wherein the mole ratio of the organometallic compound to the zinc sulfide is within the range of about 0.25:1 to about 100:1; and wherein the water is present in an amount up to about 20 gram millimoles per 100 grams monomer which is to be polymerized.

References Cited

J. of Polymer Science, vol. 47, issue 149 (1960), (pp. 486–488 relied on).

WILLIAM H. SHORT, *Primary Examiner.*

T. PERTILLA, *Assistant Examiner.*